(12) United States Patent
Keoshkerian et al.

(10) Patent No.: US 7,915,327 B2
(45) Date of Patent: Mar. 29, 2011

(54) SPHERICAL SILICA CORE-SHELL PARTICLES

(75) Inventors: Barkev Keoshkerian, Thornhill (CA); Naveen Chopra, Oakville (CA); Paul J. Gerroir, Oakville (CA)

(73) Assignee: Xerox Corporation, Norwalk, CT (US)

( * ) Notice: Subject to any disclaimer, the term of this patent is extended or adjusted under 35 U.S.C. 154(b) by 988 days.

(21) Appl. No.: 11/689,739

(22) Filed: Mar. 22, 2007

(65) Prior Publication Data

US 2008/0233509 A1 Sep. 25, 2008

(51) Int. Cl.
*C08L 83/00* (2006.01)
*C08K 9/00* (2006.01)
*B32B 27/00* (2006.01)

(52) U.S. Cl. ......... 523/201; 523/209; 428/402; 428/405

(58) Field of Classification Search ................... 523/201, 523/204, 206, 209; 525/293, 296, 29, 102, 525/301, 308–309, 342; 428/402, 405
See application file for complete search history.

(56) References Cited

U.S. PATENT DOCUMENTS

| | | | | |
|---|---|---|---|---|
| 5,273,824 A | * | 12/1993 | Hoshino et al. | 428/402.24 |
| 5,455,315 A | | 10/1995 | Paine et al. | |
| 5,461,125 A | * | 10/1995 | Lu et al. | 525/293 |
| 6,001,922 A | | 12/1999 | Clark et al. | |
| 6,841,636 B2 | * | 1/2005 | Dar et al. | 526/220 |
| 2001/0033932 A1 | * | 10/2001 | Katou et al. | 428/407 |
| 2004/0214919 A1 | * | 10/2004 | Ikeda et al. | 523/160 |
| 2008/0058473 A1 | * | 3/2008 | Freidzon et al. | 525/191 |
| 2008/0153980 A1 | * | 6/2008 | Keoshkerian | 525/88 |
| 2008/0233509 A1 | | 9/2008 | Keoshkerian et al. | |

OTHER PUBLICATIONS

Tissot et al. "Hybrid latex particles coated with Silica." Macromolecules 2001, 34, 5737-5739. PUblished on web Jun. 7, 2001.*
Graf et al. "A General Method to Coat Colloidal Particles with Silica." Langmuir 2003, 6993-670. Published on Web Jul. 11, 2003.*
U.S. Appl. No. 11/613,736, filed Dec. 20, 2006, Keoshkerian.
Office Action mailed Sep. 4, 2009 in U.S. Appl. No. 11/613,736.

* cited by examiner

*Primary Examiner* — Vasu Jagannathan
*Assistant Examiner* — Hannah Pak
(74) *Attorney, Agent, or Firm* — Oliff & Berridge, PLC

(57) ABSTRACT

A process of preparing spherical nano-sized core/shell silica particles, including providing a latex polymer dispersion comprising particles of a liquid dispersible starting polymer in a dispersion liquid, adding at least one functionalized monomer to the latex polymer dispersion and polymerizing the at least one functionalized monomer on the particles, and growing an outer silicate shell on the particles through addition and reaction of at least one silane monomer.

14 Claims, No Drawings

SPHERICAL SILICA CORE-SHELL PARTICLES

BACKGROUND

The present disclosure generally relates to silica particles. The present disclosure also relates to methods of preparing core/shell spherical silica particles, and the core/shell spherical silica particles formed by these methods.

The preparation of nano-sized and larger spherical silica particles may be prepared by many different routes, but preparation of core/shell structures of similar size is difficult. The present disclosure describes a commercially viable process to prepare core/shell spherical silicates of from about 5 nm to about 100 micron by varying the amount of reagent used in the process.

REFERENCES

In general, the processes for preparation of nano-sized polymers in a commercially viable manner are burdensome. Typically, preparation of nano-sized polymer particles results in low yields and requires large amounts of surfactant. Moreover, development time, material costs, and surfactant removal costs render conventional preparations inefficient and expensive.

In an example of the above-mentioned processes, preparation of nano-sized polymer particles occurs via a free radical polymerization process with the use of large amounts of surfactants where the ratio of surfactant to monomer is about 1:1. The nano-sized particle is formed when, during the initiation process, the radical enters the micelle. However, micelles tend to form and deform throughout the polymerization process. This ultimately limits the solids content of such polymerizations. In fact, these processes generally result in a solids content of less than 10% with higher loadings resulting in reduced nano-sized particle product and particle size of up to only about 50 nm.

Using a starve fed latex polymerization process to prepare nano-sized latex particles may produce final surfactant to monomer ratios around 1:15. This is achieved by keeping the actual surfactant to monomer ratio at any one time during the starve feed process at around 1:1. However, even with these improved methods, the particles tend to grow uncontrollably as the polymerization proceeds because micelle formation is dynamic and ongoing and the excess surfactant stabilizes the larger particles.

U.S. patent application Ser. No. 11/613,736, the disclosure of which is incorporated herein by reference in its entirety, describes the preparation of nano-particles prepared by a templating process whereby sulfonated polyester is dispersed in water at a temperature above its $T_g$ to form nano-sized particles. These nano-sized particles could then be used to grow a shell polymer (by a monomer feed) on the surface to afford core/shell polymers that could be varied from 30 nm to upwards of 500 nm depending on the amount of the monomer feed used.

Preparation of nano-sized and larger spherical silica particles may be prepared via many different routes, but preparation of core/shell structures of similar size is difficult. In fact preparation of even simple spherical silicas of varying sizes often requires different reaction conditions.

While known compositions and processes are suitable for their intended purposes, and in fact materials of such known compositions may be used herein as appropriate, a need remains for improved ability to prepare core/shell silica particles. Such core/shell silica particles may open the door to functional particles and the ability of one to prepare these varying spherical silicates.

SUMMARY

These and other improvements are accomplished by the particles described herein.

In embodiments, described is a process of preparing spherical nano-sized core/shell silica particles, comprising providing a latex polymer dispersion comprising particles of a liquid dispersible starting polymer in a dispersion liquid; adding at least one functionalized monomer to the latex polymer dispersion and polymerizing the at least one functionalized monomer on the particles; and growing an outer silicate shell on the particles through addition and reaction of at least one silane monomer.

In embodiments, described are core/shell silica particles having an organic core and an outer silicate shell, wherein the organic core comprises a polymer, and the particles have an average particle size of from about 5 nm to about 100 μm.

In embodiments, described is a core/shell silica particle having an organic core and an outer silicate shell, where the particles are generated by a process comprising providing a latex polymer dispersion comprising particles of a liquid dispersible starting polymer in a dispersion liquid; adding at least one functionalized monomer to the latex polymer dispersion and polymerizing the at least one functionalized monomer oil the particles; and growing an outer silicate shell on the particles through addition and reaction of at least one silane monomer.

EMBODIMENTS

It is desirable to have a commercially viable process to prepare nano-sized core/shell spherical silica particles of from about 5 nanometer (nm) to about 100 micron in average diameter. Such may be accomplished herein, for example by varying the amount of the silane reagent used as discussed further below.

The term "nano-sized" when referring to the average particle size or diameter refers, for example, to average particle sizes of from about 1 nm to about 500 nm, as understood by one ordinarily skilled in the art. For example, most nano-sized particles are about 20 nm. Likewise, the term "micron-sized" when referring to the average particle size refers, for example, to average particle sizes of from about 1 micron to about 100 microns.

Preparation of nano-sized core/shell spherical silica particles is accomplished herein in general by first starting with organic core particles, such as sulfonated polyester core particles, adding a functionalized silane, for example an acrylate functionalized silane, which provides a basis for building a silicate thereon, and then adding a silicate material to create the shell upon this organic core particle.

A polymer that on heating and/or stirring in water forms nano-sized particles, for example particles from about 1 nm to about 500 nm, may be used as a material for the core of the particles. Shell layers can then be grown on the core particles. For example, an initiator solution and a monomer solution may then be added to the nano-sized particle solution to result in a dispersion. The monomer may be added to the nano-sized particle solution dropwise, and contains a silane which polymerizes on the surface of the particles. The silane then acts as a template for silicate growth in a subsequent reaction by the addtion of a further silane monomer, for example, an alkoxysilane, such as tetraethoxysilane (TEOS). By varying the amount of silane from about less than 1 weight equivalent and upwards, various sized core/shell particles with polymer (core)/silicate (shell) may be prepared, for example particles from about 5 nm to about 100 micron. The silane can be added at once to provide a specific particle size or can be sequentially added until a desired particle size, as described herein, is achieved. The sequential addition of a silane assists in providing control over the particle growth, and thus makes it possible to grow larger organic/silicate particles.

In embodiments, first a dispersion of polymer particles in a liquid medium in the presence or absence of a surfactant is formed. This dispersion serves as a seed latex for subsequent shell layer growth in a starve fled free radical polymerization. This dispersion may be, for example, formed by dispersing any suitable polymer into a liquid medium in the presence or absence of a surfactant, where the polymer self-dissipates or may be dispersed to form nano-sized particles in the liquid medium.

In embodiments, the nano-sized particles forming the polymer core particles have an average particle size of, for example, from about 1 nm to about 500 nm, such as from about 15 nm to about 300 nm, or from about 20 nm to about 100 nm.

Any suitable liquid medium maybe used in forming or providing the dispersion of polymer particles, provided the starting polymer is insoluble in the liquid and has functional groups that may stabilize the polymer in the liquid. Thus, for example, suitable liquid mediums include water, such as deionized water, other inorganic solvents, organic solvents, ISOPAR and the like. For example, polymethylmethacrylate, with block or random nonpolar groups that stabilize the polymer in ISOPAR, may be used. In embodiments, water is used as it may be used to readily form dispersions of various hydrophilic polymers.

In embodiments, any suitable hydrophilic group may be used in forming or providing the dispersion of polymer particles. Thus, for example, suitable hydrophilic groups include carboxyl groups, sulfonic acids, amines, amine salts, phosphonic salts and the like. In embodiments, a polymer containing a carboxyl group is used as it, may be used to readily facilitate polymer dispersions.

In embodiments, any suitable surfactant may be used in forming or providing the dispersion of polymer particles. Thus, for example, surfactants in amounts of about 0.01 to about 15, or from about 0.5 to about 5 weight percent of the aqueous solution in embodiments, may be used. In the embodiments, DOWFAX is used as it may be used to readily facilitate polymer dispersions.

Examples of suitable surfactants that may be used for forming the polymer core thus include, but are not limited to, nonionic surfactants such as dialkylphenoxypoly(ethyleneoxy) ethanol, available from Rhone-Poulenc as IGEPAL CA-210™, IGEPAL CA-520™, IGEPAL CA-720™, IGEPAL CO-890™ IGEPAL CO-720™, IGEPAL CO-290™, IGEPAL CA-210™, ANTAROX 890™ and ANTAROX 897™ Examples of anionic surfactants include sodium dodecylsulfate (SDS), sodium dodecylbenzene sulfonate, sodium dodecylnaphthalene sulfate, dialkyl benzenealkyl, sulfates and sulfonates, adipic acid, available from Aldrich, NEOGEN R™, NEOGEN SC™, available from Kao, DOWFAX 2A1 (hexa decyldiphenyloxide disulfonate) and the like, among others. For example, an effective concentration of the nonionic or anionic surfactant is, in embodiments, from about 0.01 percent to about 15 percent by weight, or from about 0.5 percent to about 5 percent by weight of the aqueous solution.

Examples of suitable polymers that may be used for forming the polymer core thus include, but are not limited to, polymer or polymers formed from styrene-based monomers, acrylate-based monomers, polyester-based monomers, wax polymers, and polyolefins. Examples of styrene-based monomers and acrylate-based monomers include, for example, poly(styrene-alkyl acrylate), poly(styrene-1,3-diene), poly (styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), polymethyl methacrylate-butadiene), poly(ethyl methacrylate-butadiene), poly(propyl methacrylate-butadiene), poly (butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly (butyl acrylate-isoprene); poly(styrene-propyl acrylate), poly (styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly (styrene-butyl acrylate-acrylonitrile-acrylic acid), and other similar polymers.

Illustrative examples of polyester-based resins selected for the process and core particles of the present disclosure include any of the various polyesters, such as polyethylene-terephtalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate polyethylene-pimelate, polypropylene-pimelate, polybutylene-pimelate, polypentylene-pimelate, polyhexalene-pimelate, polyheptadene-pimelate, poly (propoxylated bisphenol-fumarate), poly(propoxylated bisphenol-succinate), poly(propoxylated bisphenol-adipate), poly(propoxylated bisphenol-glutarate), SPAR™ (Dixie Chemicals), BECKOSOL™ (Reichhold Chemical Inc), ARAKOTE™ (Ciba-Geigy Corporation), HETRON™ (Ashland Chemical), PARAPLEX™ (Rohm & Hass), POLYLITE™ (Reichhold Chemical Inc), PLASTHALL™ (Rohm & Hass), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation) mixtures thereof and the like. The resins may also be functionalized, such as sulfonated and particularly such as sodio sulfonated, if desired.

Other examples of polymer-based resins selected for the process and core particles of the present disclosure include waxes or polyolefins, such as polyethylene, polypropylene, polypentene, polydecene, polydodecene, polytetradecene, polyhexadecene, polyoctadene, and polycyclodecene, polyolefin copolymers, mixtures of polyolefins, bi-modal molecular weight polyolefins, functional polyolefins, acidic polyolefins, hydroxyl polyolefins, branched polyolefins, for example, such as those available from Sanyo Chemicals of Japan as VISCOL 550P™ and VISCOL 660P™, Mitsui "Hi-wax" NP055 and NP105, or wax blends such as MicroPowders, Micropro-440 and 440w.

Still other examples include block copolymers where one block is hydrophilic and at least one other block is hydrophobic. For example, poly(styrene-b-styrenesulfonate) may be used.

In embodiments, the dispersion of polymer particles or latex emulsion may be formed or provided to include as the polymer, a styrene-alkyl acrylate or a polyester such as a sulfonated polyester, and maleated olefins, such as CERAMER (Baker Hughes).

The liquid medium and polymer are generally present in the dispersion or latex in any suitable amount to provide the desired dispersion. For example, in embodiments, the polymer may be present in the dispersion in an amount of from about 1 to about 75% by weight, such as from about 5 to about 50% or from about 10 to about 25% by weight.

Once the polymer dispersion or latex is formed, it may optionally be heated to an elevated temperature in preparation for the subsequent formation of shell layers, for example, by starve fed polymerization. If heating is desired, it may be at any suitable temperature that is compatible with the reaction components, such as the polymer material, liquid medium, initiator, and additional monomer or monomers. For example, in embodiments, the polymer dispersion or latex may be heated to a temperature of from about 30° C. to about 130° C., such as from about 35° C. to about 90° C. or from about 40° C. or about 50° C. to about 75° C. or about 80° C. In embodiments, a temperature of from about 55° C. to about 80° C. may be used.

The shell growth may be conducted in any suitable manner, such as by free radical polymerization suck as starve feed free radical polymerization. Starve feed polymerization is desired, in embodiments, because it allows for more precise control of particle size growth and loading concentration. Further, starve feed polymerization has the benefit that at any given time, a ratio of surfactant to monomer may be maintained at a suitable level of for example about 1:1. These conditions are particularly suitable for desired particle growth.

To form the shell portion, further polymerization may be initiated. To initiate polymerization, a suitable initiator and suitable monomer are added to the polymer dispersion.

Desirably, all of the initiator is added at the same time, either prior to monomer addition or at the start of monomer addition. However, the initiator or initiators may also be metered in over time. In embodiments, any suitable initiator may be used. Examples of useful optional free radical initiators that may be selected include azo-type initiators such as 2-2'-azobis(dimethyl-valeronitrile), azobis(isobutyronitrile), azobis(cyclohexane-nitrite), azobis(methyl-butyronitrile), mixtures thereof, and the like, peroxide initiators such as benzoyl peroxide, lauroyl peroxide, methyl ethyl ketone peroxide, isopropyl peroxy-carbonate, 2,5-dienethyl-2,5-bas(2-ethylhexanoyl-peroxy)hexane, di-tert-butyl peroxide, cumene hydroperoxide, dichlorobenzoyl peroxide, persulfate initiators such as potassium persulfate, ammonium persulfate, sodium bisulfate, combination of potassium persulfate, sodium bisulfate and the like, and mixtures thereof An effective quantity of an initiator is generally about 0.01 percent to about 10 percent by weight of the monomer.

To proceed with shell growth, the desired monomer or monomers are next added to the polymer dispersion or latex. Selection of specific monomer or monomers may be conducted, for example, to provide desired polymer particle properties, structure, or the like. In embodiments, any suitable monomer or monomers may be added for particle growth, including any of the monomers mentioned above for use in forming the polymer dispersion or latex. Thus, for example, the same monomer or monomers used in forming the polymer dispersion or latex may be used where uniform particle chemistry is desired, or different monomer or monomers may be used where non-uniform particle chemistry is desired. For example, if a different monomer(s) is used, then the final polymer particles would have the appearance of a core-shell particle, where the shell is formed of a different polymer than the core. Alternatively, if two or more different monomers or mixtures of monomers are successively added during the polymer particle growth, then the final polymer particles would have the appearance of an onion, where successive concentric layers are formed of different polymers.

Furthermore, monomers miscible or immiscible with the particle may be used to design particle morphology. In embodiments, immiscible monomers exhibit phase separation from the newly formed polymer. In embodiments, the core-shell location will be effected by the hydrophilicity of the monomer and the particle polymer. Other modifications will be apparent based on the disclosure.

Examples of suitable monomers are not limited, and may include any one or more of, for example, styrene, methacrylates, amides, amines, acrylates such as methacrylates, butylacrylates, β-carboxy ethyl acrylate (β-CEA), etc., butadiene, isoprene, acrylic acid, methacrylic acid, itaconic acid, acrylonitrile, benzenes such as divinylbenzene, etc., and the like, Known chain transfer agents, for example dodecanethiol or carbon tetrabromide, may be utilized to control the molecular weight properties of the polymer. Any suitable method for forming the latex polymer from the monomers may be used without restriction. Mixtures of two or more of the above polymers may also be used, if desired.

The monomer or monomers selected should not only be capable of polymerizing on or within the core polymer, it desirably is also capable of acting as a template to which a silicate forming silane monomer may link so as to form a silica shell on the particle. To this end, the monomer or monomers are desirably functionalized. The monomer polymerizes to the surface of the particles, for example due to the presence of the functionalizing groups. Any of the above-listed monomers may be used as functionalizing groups. In embodiments, acrylate or methacrylate functionalized silane monomer, for example an acrylate or methacrylate functionalized alkoxysilane monomer, may be used. Examples include acrylate or methacrylate functionalized trialkoxy silane monomer, such as acrylate or methacrylate functionalized trimethoxysilane. The silane of the monomer acts as a template for silicate growth in a subsequent reaction by the addition of silane, for example, a silica shell-forming silane such as an alkoxysilane.

The addition of the monomer or monomers to the polymer dispersion or latex may be conducted by manual, mechanical, electronic, automatic, or the like, drop-wise or metered addition.

In embodiments, the monomer is added drop-wise. Drop-wise addition of the monomer allows for more precise control of particle size growth and duration of polymerization. Further, drop-wise addition has the benefit of stabilizing and facilitating the starve feed polymerization process. These conditions are particularly suitable for desired particle growth.

The addition of the monomer or monomers to the polymer dispersion or latex may be conducted for any suitable amount of time. For example, in embodiments, monomers may be added for a period from about 2 hours to about 4.5 hours, such as about a 3.5-hour period or about a 4-hour period. These periods are desired, in embodiments, because they provide a suitable polymerization reaction. However, it will be apparent that the addition time will be related to the desired addition rate and method, and the amount of monomer or monomers to be added.

Any suitable amount of monomer or monomers may be added to the polymer dispersion or latex during the monomer addition to obtain the desired particle size and structure. For example, in embodiments, drops of monomer solution are applied step-wise, such as a drop of monomer solution applied constantly over a period of time. In other embodiments, monomer solution may be added at one time in the amount of from about 1 weight percent to about 10 weight percent of the core polymer weight to generate a particle having a specific size. A drop-wise addition is desired, in embodiments, because it accomplishes controlled starve feed polymerization.

The addition of monomer or monomers may be added to the polymer dispersion or latex at any suitable rate of addition. For example, in some embodiments, the rate of monomer addition is constant and regular over the period of addition. In embodiments, monomer addition may also be constant and irregular, or inconsistent and irregular, or the like. Constant rate of addition is desired, in embodiments, because it allows for consistent and stable polymer growth.

The reaction of monomer or monomers and the polymer dispersion or latex may occur by any suitable means. For example, in embodiments, the reaction occurs exothermically upon mixing of the monomer solution and the polymer dispersion. In embodiments, the reaction may also occur with heat application, shaking, stirring, pressure adjustment, or addition of catalysts, by manual or automatic means. A stand alone exothermic reaction or reactions is desired, in embodiments, because it provides a suitable environment for controlled polymerization.

The reaction of monomer or monomers and the polymer dispersion or latex may be conducted at any suitable temperature, and may be conducted with or without external heating. For example, although an exotherm typically will occur upon reaction of the monomer(s) and the polymer dispersion or latex, additional heating or cooling may also be applied during the reaction. In embodiments, the reaction mixture is desirably kept at about a constant temperature, to provide desirable reaction kinetics. For example, the reaction mixture may be maintained at a temperature of from about room temperature to about 150° C., such as from about 30° C. or 40° C. to about 100° C. or about 125° C., such as from about 60° C. to about 80° C. In embodiments, heating is desired because it increases the reaction rate.

In embodiments, after completion of monomer or monomers addition, further heating for a period of time may be conducted to assist with polymerization to high conversion. The heating may be conducted at any suitable temperature, such as at the reaction temperature maintained during monomer or monomers addition.

After the heating period, the monomer-polymer dispersion reaction is next optionally cooled. The cooling may occur continuously or discontinuously, with interrupted periods of further heating or stagnant cooling rate, and naturally or mechanically, such as by refrigeration, or by any suitable means, and continues for as long or short as necessary for polymer growth to slow enough for suitable extraction. For example, in embodiments, cooling occurs continuously and naturally.

The resulting nano-sized particles have a polymer core with an alkoxysilane derivitized shell thereon.

In embodiments, a silica shell may then be formed on the resulting nano-sized particles with the derivitized shell. The shell is formed by the addition of alkoxysilanes, either at once or dropwise, in amounts of from about 10 weight percent to 500 weight percent relative to the nano-sized particle dispersion, such as from about 50 weight percent to about 150 weight percent relative to the nano-sized particle dispersion. The resulting nano-particles may contain silicate on the surface.

In embodiments, any suitable silica shell-forming silane may be used, including, for example, alkoxysilanes such as tetraethoxysilane (TEOS) or aminopropyltrimethoxysilane.

By varying the amount of silane from about 0.1 weight equivalent and upwards, various sized core/shell particles with polymer (core)/silicate (shell) may be prepared, for example particles from about 20 nm to about 1 micron.

In embodiments, for example, the silane may be added in an amount of about 10 weight percent to 150 weight percent relative to the particle size, and result in a core/shell silica particle size from about 1 times to about 3 times the original particle size. For example, in further embodiments, the silane may be added in an amount of about 50 weight percent to about 200 weight percent relative to the particle size, and result in a core/shell particle size from about 2 times to about 10 times the original particle size.

In embodiments, the silane is added to the particle dispersion over a period of time, for example, it is added at regular intervals. For example, initially an amount of silane may be added to the dispersion, then a period of time later an additional amount of silane may be added, and another period of time later an additional amount of silane may be added and so on (see Table 1). As a result, the sequential addition of silane permits growth of significantly larger organic/silicate particles. By the sequential addition of silane, significantly larger organic/silicate particles may be grown.

In embodiments, the silane may be added to the particle dispersion over a period of time in amounts of, for example, from about 10 weight percent to about 100 weight percent relative to the weight of the particles, for each addition. That is, the silane may be initially added in an amount from about 10 weight percent to about 100 weight percent relative to the weight of the particles, then after about 1 hour an additional amount of silane from about 10 weight percent to 100 weight percent, relative to the weight of the particles, may be added, then after about 2 hours an additional amount of silane from about 10 weight percent to 100 weight percent, relative to the weight of the particles is added, then after 3 hours an additional amount of silane from about 10 weight percent to 100 weight percent, relative to the weight of the particles is added and then after about 5 hours an additional amount of silane from 10 weight percent to 100 weight percent, relative to the weight of the particles is added to the particle dispersion.

In embodiments, the particle size of the organic/silicate particles may be for example from about 5 nm to about 100 µm, such as from about 25 nm to about 400 nm, and from about 140 nm to about 250 nm.

In embodiments, the particles may optionally be harvested. For example, any suitable manual, mechanical, electronic, or automatic means for optionally separating, drying, diluting, emulsifying, siphoning or the like, the cooled polymer solution may be used as a means for harvesting the functional polymers. Alternatively, in embodiments, the dispersion of functionalized polymer particles may be directly used, without intermediate separation, in subsequent processes.

In embodiments, the particles may be used in toners, for example, toners containing the nano-sized core/shell silica particles. The nano-sized core/shell silica particles may be incorporated into toners as the starting binder resin of a toner. The nano-sized core/shell silica particles may also be used as charge control agents or as tougheners for more robust toners.

EXAMPLES

Example 1

Preparation of PE-core-TriMeOSilane Derivitized Shell

To a 2 L reaction kettle was added highly sulfonated polyester (HSPE, 134.5 g) and water (865.5 g). This was heated to 80 C to give the nano-sized particles. To this was added initiator solution (ammonium persulfate-APS, 2.3 g in 32.7 g water) all at once and then drop wise, a monomer solution (styrene (58 mL), butylacrylate (18 mL), betacarboxyethylacrylate (2.1 g), dodecylthiol (2.68 g) and trimethoxysilylpropylmethacrylate (14.2 g)) over 160 minutes. The dispersion was heated for 8 hours and then cooled. This resulted in 1054.5 g of dispersion.

Preparation of Organic/Silicate Core Shells

Example 2

Preparation of About 23 nm Sized Organic/Silicate Particle

To 100 g of Example 1 dispersion was added TEOS (16.4 g) and stirred at room temperature over the weekend. Samples taken at 40 minutes, 240 minutes and over the weekend show that the particle size grows from about 20.7 nm to about 23 nm quickly and then does not grow any larger. This is consistent with the expected particle size growth for an increase of volume by the addition of one weight equivalent.

Example 3

Preparation of About 40 nm Particles

To 99 g of Example 1 dispersion was added TEOS (43.3 g) and stirred at room temperature over night. Samples taken at 60 minutes, 420 minutes and over night show that the particle size grows from about 20.7 nm to about 42 nm quickly and then does not grow any larger. This is consistent with the expected particle size growth for an increase of volume by the addition of a 2.5 weight equivalent.

Example 4

Preparation of About 140 nm Particles

To 104.2 g of Example 1 dispersion was added TEOS (65.3 g) and stirred at room temperature over night. Samples taken at 20 minutes, 420 minutes and over night show that the particle size grows from about 20.7 nm to about 140 nm quickly and then does not grow any larger.

Example 5

Preparation of About 245 nm Particles

To 104.2 g of Example 1 dispersion was added TEOS (18.8 g) and stirred at room temperature for 55 minutes. To this was then added at regular intervals more TEOS (see table 1). After the final addition of TEOS, the reaction was left stirring over night.

TABLE 1

| Sequential Addition of TEOS | |
|---|---|
| Time (min.) | TEOS added (g) |
| 0 | 18.8 |
| 55 | 20.8 |
| 110 | 20.8 |
| 180 | 20.8 |
| 300 | 16.2 |

The total amount of TEOS added was 97.4 g. When TEOS of this quantity (104 g) is added all at once, the particle control is lost and results in micron sized multimodal particles. However, by the sequential addition of TEOS, significantly larger organic/silicate particles may be grown.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims. Unless specifically recited in the claim, steps or components of claims should not be implied or imported from the specification or any other claims as to any particular order, number, position, size, shape, angel, color, or material.

What is claimed is:

1. A process of preparing spherical nano-sized core/shell silica particles, comprising
    providing a latex polymer dispersion comprising liquid dispersible starting polymer particles in a dispersion liquid;
    adding at least one functionalized monomer on the latex polymer dispersion and polymerizing the at least one functionalized monomer on the liquid dispersible starting polymer particles to form a particle having a first shell derived from the at least one functionalized monomer; and
    growing an outer silicate shell on the particle having a first shell through addition and reaction of at least one silane monomer to form a particle having an outer most shell derived from the at least one silane monomer,
    wherein the nano-sized core/shell silica particles have an organic core formed of the liquid dispersible starting polymer,
    wherein the liquid dispersible starting polymer is a sulfonated polyester resin,
    wherein the nano-sized core/shell silica particle size is from about 5 nm to about 100 μm, and
    wherein the at least one silane monomer is added in an amount of 10 weight percent to 150 weight percent relative to a size of the particle having a first shell.

2. The process of claim 1, wherein all of the at least one silane monomer is added to the latex polymer dispersion at once.

3. The process of claim 1, wherein the silane is sequentially added over time to the latex polymer dispersion.

4. The process of claim 1, wherein the liquid dispersible starting polymer is insoluble in the dispersion liquid, and the dispersion liquid comprises water.

5. The process of claim 1, wherein the size of the latex polymer dispersion particles range from about 1 nm to about 500 nm.

6. The process of claim 1, wherein the dispersion liquid comprises at least one initiator selected from the group consisting of azo-type initiators, peroxide initiators and persulfate initiators.

7. A process of preparing spherical nano-sized core/shell silica particles, comprising
providing a latex polymer dispersion comprising liquid dispersible starting polymer particles in a dispersion liquid;
adding at least one functionalized monomer on the latex polymer dispersion and polymerizing the at least one functionalized monomer on the liquid dispersible starting polymer particles to form a particle having a first shell derived from the at least one functionalized monomer; wherein the at least one functionalized monomer is an acrylate or methacrylate functionalized alkoxysilane; and
growing an outer silicate shell on the particle having a first shell through addition and reaction of at least one silane monomer to form a nano-sized core/shell silica particles having an outer most shell derived from the at least one silane monomer,
wherein the nano-sized core/shell silica particles have an organic core formed of the liquid dispersible starting polymer,
wherein the liquid dispersible starting polymer is a sulfonated polyester resin,
wherein the core/shell silica particle size is from about 5 nm to about 100 μm,
wherein the acrylate or methacrylate functionalized trimethoxysilane, and
the at least one silane monomer is added in an amount of 10 weight percent to 150 weight percent relative to a size of the particle having a first shell.

8. The process of claim 1, wherein the at least one functionalized monomer is added over a time period of from about 2 hours to about 4.5 hours.

9. The process of claim 1, wherein the at least one functionalized monomer is provided drop-wise.

10. The process of claim 1, wherein the at least one silane monomer is an alkoxysilane.

11. The process of claim 10, wherein the at least one silane monomer is sequentially added into the latex polymer dispersion in one pot.

12. The process of claim 10, wherein the at least one silane monomer is added in an amount of from about 10 weight percent to about 50 weight percent relative to the latex polymer dispersion, then repeated sequentially every hour until the nano-sized core/shell silica particle size of from 5 nm to about 100 μm is achieved.

13. The process of claim 10, wherein the at least one silane monomer is tetraethoxysilane or aminopropyltrimethoxysilane.

14. The process of claim 7, wherein the at least one silane monomer is an alkoxysilane.

* * * * *